US012303850B2

(12) United States Patent
Rönnback et al.

(10) Patent No.: US 12,303,850 B2
(45) Date of Patent: May 20, 2025

(54) MINIATURISED DEVICE FOR AUTOMATED MANUFACTURE OF PHARMACEUTICAL COMPOSITIONS, AND ASSOCIATED METHOD

(71) Applicant: FERRING B.V., Hoofddorp (NL)

(72) Inventors: Robert Rönnback, Morges (CH); Josselin Saunier, Chernex (CH)

(73) Assignee: Ferring B.V., Hoofddorp (NL)

( * ) Notice: Subject to any disclaimer, the term of this patent is extended or adjusted under 35 U.S.C. 154(b) by 969 days.

(21) Appl. No.: 17/287,802

(22) PCT Filed: Oct. 25, 2019

(86) PCT No.: PCT/EP2019/079311
§ 371 (c)(1),
(2) Date: Apr. 22, 2021

(87) PCT Pub. No.: WO2020/084159
PCT Pub. Date: Apr. 30, 2020

(65) Prior Publication Data

US 2021/0308642 A1 Oct. 7, 2021

(30) Foreign Application Priority Data

Oct. 25, 2018 (FR) ........................................ 1859870

(51) Int. Cl.

| | |
|---|---|
| ***B01F 33/00*** | (2022.01) |
| ***B01F 23/80*** | (2022.01) |
| ***B01F 27/88*** | (2022.01) |
| ***B01F 33/84*** | (2022.01) |
| ***B01F 35/10*** | (2022.01) |
| ***B01F 35/22*** | (2022.01) |
| ***B01F 35/221*** | (2022.01) |

(Continued)

(52) U.S. Cl.
CPC ........ *B01F 33/8442* (2022.01); *B01F 23/808* (2022.01); *B01F 27/88* (2022.01); *B01F 33/848* (2022.01); *B01F 35/146* (2022.01); *B01F 35/2202* (2022.01); *B01F 35/2218* (2022.01); *B01F 35/881* (2022.01); *B01F 35/92* (2022.01); *B01F 2101/22* (2022.01)

(58) Field of Classification Search
CPC .............. B01F 33/8442; B01F 35/2218; B01F 35/881; B01F 35/92; B01F 23/808; B01F 35/146; B10F 2101/22
See application file for complete search history.

(56) References Cited

U.S. PATENT DOCUMENTS

2011/0168293 A1 7/2011 Van Vreeland et al.
2012/0241045 A1 9/2012 Aouad (Continued)

*Primary Examiner* — Anshu Bhatia
(74) *Attorney, Agent, or Firm* — Foley & Lardner LLP

(57) ABSTRACT

The present invention relates to a device (60) for manufacturing pharmaceutical compositions, comprising: a support (62); a mixing container (16); a plurality of reservoirs (18, 20) containing starting materials for the composition of a medicament; at least one dispensing device (64, 66) that is designed to dispense an amount of a starting material into the mixing container, wherein the dispensing device is assembled, or is designed to be assembled, with a reservoir; a stirring device (68) that is able to stir the mixing container and/or the contents of the mixing container; and an electronic module (74) for controlling the at least one dispensing device.

16 Claims, 5 Drawing Sheets

(51) Int. Cl.
*B01F 35/88* (2022.01)
*B01F 35/92* (2022.01)
*B01F 101/22* (2022.01)

(56) References Cited

U.S. PATENT DOCUMENTS

| | | | | |
|---|---|---|---|---|
| 2014/0150379 | A1* | 6/2014 | Aguerre ................ | B08B 15/023<br>53/473 |
| 2015/0257974 | A1 | 9/2015 | Demers et al. | |
| 2018/0080952 | A1 | 3/2018 | Lehtonen et al. | |

* cited by examiner

-100-

MINIATURISED DEVICE FOR AUTOMATED MANUFACTURE OF PHARMACEUTICAL COMPOSITIONS, AND ASSOCIATED METHOD

CROSS-REFERENCE TO RELATED APPLICATIONS

The present application is the U.S. National Stage of International Application PCT/EP2019/079311, filed Oct. 25, 2019, and claims priority to French Patent Application No. 1859870, filed Oct. 25, 2018.

The present invention relates to a device for manufacturing pharmaceutical compositions.

The manufacture of pharmaceutical compositions is different from the manufacture of other products. Indeed, given its importance for society and the risks it is likely to pose to public health, it is subject to special regulations. For example, in most countries, it is necessary to obtain a marketing authorization (MA) before a pharmaceutical composition can be marketed. Administrations such as the FDA in the United States, or the European Medicines Agency in the European Union (which cooperates with national agencies such as the ANSM in France), control pharmaceutical compositions. The manufacture of the latter must meet certain requirements. In particular, it must comply with the so-called GMP (Good Manufacturing Practices), which describe the minimum requirements that a manufacturer must meet in its production process. The European Medicines Agency verifies requirements called EU-GMP (European Union GMP), the FDA verifies requirements called CGMP (for current GMP) codified in Title 21 of the Code of Federal Regulations, and the World Health Organization also defines GMP ("WHO GMP") enforced by about 100 other states. In the following, any reference to compliance with GMPs implies compliance with at least one of the following: WHO GMP, European EU-GMP, USA's CGMP, Australia's GMP, Canada's GMP and Japan's GMP. The manufacture of pharmaceutical compositions within the meaning of the present invention must comply with GMPs.

US 2018/0080952 A1 discloses an automatic dispenser for laboratory solutions. Although it can be used in the medical field, it is not intended for the manufacture of pharmaceutical compositions (a surgical tool cleaning solution is in the medical field but is not a pharmaceutical composition). US 2011/0168293 A1 discloses a method for filling containers.

Pharmaceutical compositions that are manufactured industrially are generally prepared in large quantities, according to methods lasting several days. The conditions of preparation, in a sterile environment and/or under a controlled atmosphere, are often restrictive.

However, research is currently under way on the automated small-scale manufacturing of industrial batches as well as the production of personalized medicines, allowing, in particular, the tailoring of the dosage to each patient.

It is therefore advantageous to have means for producing pharmaceutical compositions in small quantities, within a short period of time, while respecting the conditions of hygiene/safety and quality of the pharmaceutical field (in particular GMPs).

The present invention aims to provide such a means of production (preferably for a liquid pharmaceutical composition, which does not exclude the presence of solid starting materials). For this purpose, the object of the invention is an automated manufacturing device of the aforementioned type, comprising a mixing unit, wherein the mixing unit comprises: a support; at least one mixing container received on the support; a plurality of reservoirs, each of which is designed to contain a quantity of a starting product used in the composition of a medicament; at least one dispensing device capable of dispensing a quantity of a starting material into the mixing container, wherein the dispensing device is assembled, or is capable of being assembled with a reservoir; a stirring device capable of stirring the mixing container and/or contents of the mixing container. The manufacturing device further comprises an electronic module to control the at least one dispensing device.

According to other advantageous aspects of the invention, the manufacturing device comprises one or more of the following characteristics, taken separately or in any technically feasible combination:

- the mixing unit further comprises a mechanical arm that is movable relative to the support, wherein one end of the mechanical arm comprises a coupling member, wherein the mechanical arm is able to move at least one of the plurality of reservoirs with respect to the mixing container or with respect to the at least one stirring device;
- the mixing unit comprises a device for moving the mixing container, and is designed to position the container in a dispensing position relative to the at least one dispensing device;
- the plurality of reservoirs comprises at least one solid reservoir and/or at least one liquid reservoir; wherein the mixing unit further comprises: at least one solid distribution device, assembled or capable of being assembled with the at least one solid reservoir, wherein the solid distribution device is able to dispense a quantity of powdery solid composition in the mixing container; and/or at least one liquid dispensing device, assembled or capable of being assembled with the at least one liquid reservoir, wherein the liquid dispensing device is able to dispense a quantity of liquid composition into the mixing container;
- the stirring device is chosen from among: a centrifugation device that is able to receive the mixing container and rotate the container, a magnetic stirring device and a mechanical stirring device;
- the mixing unit further comprises a weighing device that is designed to receive the mixing container, wherein the weighing device is electronically connected to the electronic control module;
- the mixing unit further comprises at least one analysis device capable of analyzing the contents of the mixing container;
- the manufacturing device comprises an electronic control module that controls the operation of all the steps of the manufacturing method.
- the manufacturing device further comprises a processing unit, wherein the processing unit is designed to process the contents of the mixing container and preferably comprises a filter;
- the manufacturing device further comprises a packaging assembly that is designed to package the contents of the mixing container in at least one packaging container.

The invention further relates to a method of manufacturing a medicament by means of a manufacturing device as described above, wherein the method comprises the following steps: dispensing, into the mixing container, a quantity of a starting product contained in a first reservoir; repeating the previous step for at least a second reservoir; then stirring the contents of the mixing container; and then possible analysis of the contents of the mixing container.

According to other advantageous aspects of the invention, the manufacturing method may comprise one or more of the following characteristics, taken separately or in any technically feasible combination:

- the mixing container is positioned on the weighing device; the dispensing step is effected by moving a reservoir above the mixing container or by moving the mixing container under the reservoir or at least one dispensing device; then actuating the at least one dispensing device to deposit by gravity, in the mixing container, the predetermined amount of starting material contained in the first reservoir; wherein the predetermined amount of starting material has a predetermined mass, while the deposition of the predetermined mass is controlled by the weighing device;
- the mixing container is positioned on the stirring device; and then by actuation of the stirring device, the contents of the mixing container are mixed for a predetermined time until they are completely homogenized and/or solubilized at the end of the stirring;
- after the stirring step, the contents of the mixing container are analyzed by the at least one analysis device; and if a result of the analysis is different from an expected result, an amount of a starting material is added to the mixing container and the stirring and analyzing steps are carried out again until an analysis result in accordance with the expected specifications is obtained;
- if it is necessary to produce a solution with a volume greater than the capacity of the mixing container, the contents of the mixing container may be transferred to another higher volume mixing container;
- at least one starting material deposited in the mixing container is a liquid composition; and, after the last stirring step, if the result of the analysis is in accordance with the expected result, the contents of the mixing container are ready to be filtered;
- after the stirring step, the contents of the mixing container are packaged in at least one packaging container.

The mixing content may also be transferred directly, possibly to an analysis or filtration device.

The invention will be better understood upon reading the description which follows, given solely by way of non-limiting example and with reference to the drawings wherein:

FIG. 1 shows a device 100 for manufacturing pharmaceutical compositions, according to one embodiment of the invention.

Figure 1:
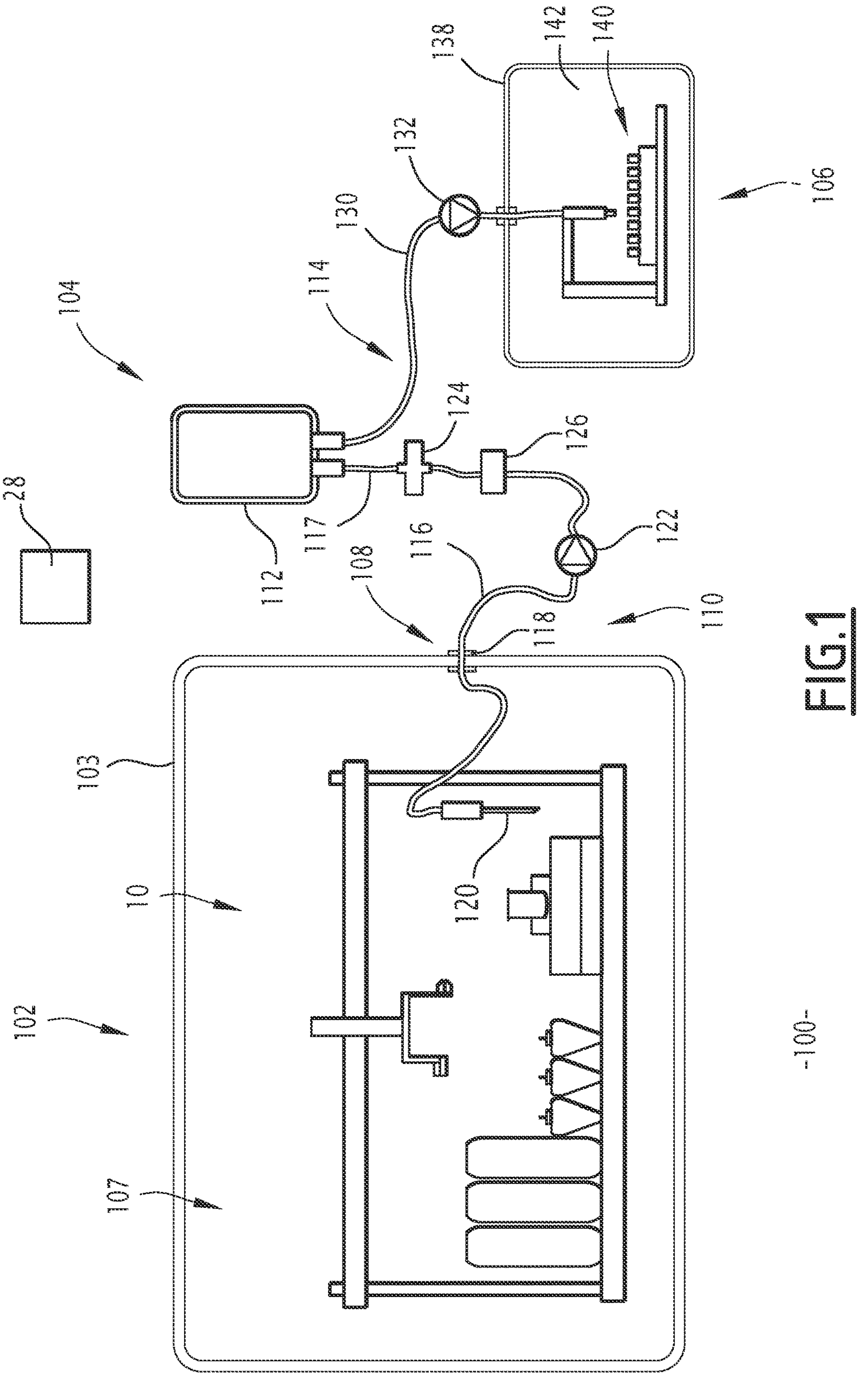
FIG. 1 shows a schematic view of a manufacturing device according to one embodiment of the invention, comprising a mixing unit and a packaging unit.

The manufacturing device 100 comprises, in particular: a mixing assembly 102, a processing device 104 and a packaging assembly 106. The manufacturing device 100 further comprises an electronic control module 28.

The mixing assembly 102 comprises: a first controlled atmosphere enclosure 103, and a mixing unit 10. The mixing unit 10 is shown alone in FIG. 2.

This first enclosure is useful in that it improves protection against contamination, particularly by microorganisms or particles that might otherwise have been present in the atmosphere and might have polluted the contents of the mixing unit (due to higher rate of microorganisms or particles in the upstream process), thus facilitating compliance with GMPs. In a traditional pharmaceutical factory, entire rooms of the buildings forming the factory may have to be placed under a controlled atmosphere in order to guarantee production in compliance with GMPs. This implies significant constraints on real estate. On the contrary, the invention proposes using a manufacturing device comprising a mixing set, which is not of a real estate nature. Quite the opposite—it is a kind of "furniture" since it is an equipment (which can take the form of a glass cabinet) that can be placed in a building (pharmacy, hospital, etc.) and can be moved if necessary. It is the atmosphere inside this "piece of furniture" that is controlled, while the building in which this "piece of furniture" is installed can be a conventional building (without any particular protection of its interior atmosphere).

The mixing unit 10 comprises in particular: a support 12; a mechanical arm 14 that is movable relative to the support; a mixing container 16; a plurality of reservoirs 18, 20; at least one device 22 for dispensing a starting product; a weighing device 23; a stirring device 24; and at least one analysis device 25, 26.

The support 12 comprises, for example, a platform 30, uprights 32 and a rail 34 arranged at a given height between the uprights. The rail 34 extends in a main horizontal direction along the platform 30.

The mechanical arm 14 is assembled with the rail 34 and provided with mechanical means sliding along the rail. The mechanical means, for example wheels, are preferably controlled by the electronic module 28.

The mechanical arm 14 comprises one or more coupling members 36, 38. A first coupling member 36 is, for example, a mechanical clamping member. As will be detailed later, a second coupling member 38 is designed to interact with a reservoir 18.

The mixing container 16 is, for example, a beaker-type container, comprising an upper opening 39. Preferably the mixing container 16 has a capacity of less than 1 L and more preferably between 10 mL and 500 mL.

The reservoirs 18, 20 are movable relative to the support 12 by means of the mechanical arm 14. Each reservoir 18, 20 is able to contain an amount of a starting product used in the composition of a medicament.

The plurality of reservoirs 18, 20 comprises at least one solid reservoir 18 and/or at least one liquid reservoir 20. Preferably, the plurality of reservoirs 18, 20 comprises at least one liquid reservoir 20. In the embodiment shown, the plurality of reservoirs 18, 20 comprises a plurality of solid reservoirs 18 and a plurality of liquid reservoirs 20.

Each solid reservoir 18 is capable of containing a quantity of a starting material in the form of a solid powdery composition. The starting material contained in a reservoir 18 is, for example, a pharmaceutical active ingredient or an excipient used in the manufacture of medicaments.

Figure 3:
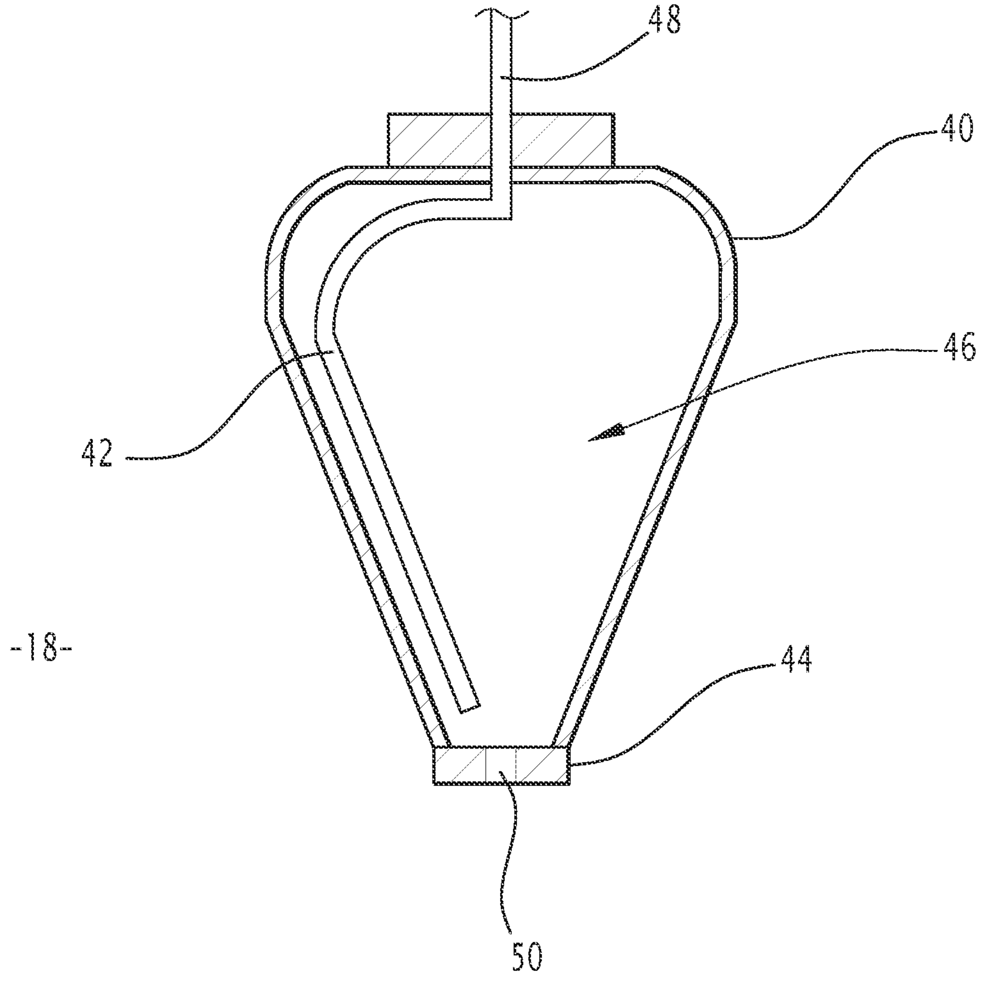
FIG. 3 shows a schematic sectional view of a reservoir of the mixing unit of FIG. 2 according to one embodiment of the invention.

In the embodiment shown, it is considered that each solid reservoir 18 of the mixing unit 10 is substantially identical to the reservoir 18 shown in section in FIG. 3.

The reservoir 18 comprises a vial 40, a stirring rod 42 and a dispensing mechanism 44. The vial 40 is, for example, made of metal or plastic, preferably of a USP class VI (and thereby biocompatible, according to US rules) material or the like, and defines a closed internal space 46 that is able to receive the solid powdery composition.

The dispensing mechanism 44 is integral with the vial 40 and preferably forms a bottom wall of the internal space 46. The dispensing mechanism 44 is able to form an opening 50 whose size may be reversibly controlled (depending on the extent of its opening or closing), at the bottom of the internal space 46.

According to an advantageous embodiment, this opening 50 is similar in construction to that of a camera iris diaphragm. Thus, this opening can be formed using a set of metal lamellae (e. g. between five and nine lamellae), the edge of the lamellae defining, for example, a regular polygon. According to an possible embodiment, the opening or closing of the opening is obtained by pins placed on a ring of the iris diaphragm, which mechanically allows the opening or closing of the iris diaphragm by a control element placed on the edge of the iris diaphragm. accordingly, in a preferred embodiment, the dispensing mechanism 44 comprises an iris diaphragm, allowing continuous adjustment between full opening and maximum closure. The opening/closing of the diaphragm is preferably controlled by the electronic module 28.

A first end of the stirring rod 42 is received in the internal space 46. A second end 48 of the stirring rod emerges outside the vial 40, preferably in the upper portion of the vial.

The second coupling member 38 of the mechanical arm 14, is designed to interact with a solid reservoir 18, and, in particular, comprises a motor capable of moving the stirring rod 42.

Each liquid reservoir 20 comprises a casing 52, for example made of stainless steel, or in the form of a disposable plastic bag, preferably made of a USP class VI material or the like. Each liquid reservoir 20 further comprises means for assembly with the dispensing device 22. The liquid reservoirs 20 are intended, in particular, to contain water or solutions of excipients or active ingredient.

Preferably, each reservoir 18, 20 comprises an identifier, for example a visual identifier of the QR code type; while the mechanical arm 14 comprises a reader designed to recognize the identifier.

The dispensing device 22 is, for example, a dispensing valve, in particular of the throttling valve or “pinch-valve” type. A “pinch-valve” type device consists in having the liquid flow through a flexible tube (made for example from a synthetic polymer) and pinching this tube from the outside (with a throttling device, for example mechanically or by injecting compressed air which compresses this flexible tube from its external face) to control the flow. Such a device is advantageous because of the high precision it allows, especially when it is a proportional pinch-valve type device (as opposed to an all-or-nothing system). Such a device is also advantageous in that it isolates the throttle device and the liquid (the liquid is in contact only with the inner surface of the flexible tube, and the risks of contamination are therefore reduced, thus facilitating compliance with GMPs). It is also advantageous due to the perfectly tight closure it allows. According to a first variant embodiment, the dispensing device 22 may be displaced with respect to the support 12. According to a second variant embodiment, the dispensing device 22 is located above the mixing container 16.

The weighing device 23, of the precision weighing device type, receives, or is able to receive, the mixing container 16. Preferably, the weighing device 23 is an electronic weighing device connected to the electronic module 28.

The stirring device 24 is able to stir the contents of the mixing container 16. The stirring device 24 receives, or is able to receive, the mixing container 16. For example, the stirring device 24 assembled with the mixing container 16, is arranged on the weighing device 23.

In the embodiment shown, the stirring device 24 is a centrifuge. Alternatively, the stirring device may be, for example, an ultrasonic bath, mechanical stirring of the stirring blade type or magnetic stirring. Optionally, the stirring device 24 may be equipped with an element for cooling or heating the mixing container 16.

At least one analysis device 25, 26, connected to the electronic module 28, is intended to control the contents of the mixing container 16. In the embodiment shown, the mixing unit 10 comprises analysis devices, for example a pH meter 25 and a spectrometer 26 with or without contact, in particular of the UV or Raman type. This device is advantageous in particular in that it allows a fine analysis, relating to the content of a mixing container 16, and operates this measurement in an almost instantaneous way, by contrast with techniques of the prior art such as the so-called HPLC technique (which often takes between 8 hours and 24 hours). The pharmaceutical composition can typically be produced in about 2 hours, whereas according to the previous art it takes almost a day. The invention also avoids periods of storage and pause (pending analytical results), which are encountered in conventional production before the start of a later stage of production (critical analysis).

As an illustration, in a traditional industrial production, the complete manufacturing process generally takes about three months:

- bulk product manufacture (i.e. products that are not packaged and are without labels, leaflets or cardboard): in principle one day, but it can take up to two or three weeks when a production slot is lost;
- validation (quality assurance and quality control) followed by release of bulk products: four to six weeks;
- shipment of bulk products to the manufacturer of the pharmaceutical composition: two days;
- storage of bulk products by the manufacturer of the pharmaceutical composition (on a packaging site): about one month (although efforts are made to minimize stocks, it is in general necessary to have at least one month of stocks, and these stocks are consumed according to a FIFO principle-first in first out-, i.e. an item is removed from stocks before the items that entered the stocks after it);
- secondary packaging: two days;
- validation (quality assurance and quality control) followed by release of the packaged pharmaceutical compositions: approximately one week;
- shipment of packaged pharmaceutical compositions to a distribution center: one day;
- storage of finished products by the distribution center: about a month (usually one month of stocks is required, and this storage, also in FIFO, is also an integral part of the manufacturing process);
- validation (quality assurance) followed by release of the packaged pharmaceutical compositions: about two weeks.

On the contrary, in a production according to the invention, the complete manufacturing process takes a maximum of about three weeks (the manufacturing, in small batches, of pharmaceutical products is accelerated, and the subsequent packaging and quality stages are also accelerated):

- on-demand production of small quantities of pharmaceutical products: one day maximum;
- the shipment of pharmaceutical products to the packaging site of the pharmaceutical composition is not necessary (but possible as an option), because the packaging unit (included in the second enclosure), of very low capacity and inexpensive, can be attached to (or even included in) the manufacturing device (e.g. by being included in the first enclosure);

secondary packaging by the packaging unit according to the invention: although it only takes about 2 hours, one day is counted for safety;

validation (traditional quality assurance and quality control) followed by release of packaged products: about two weeks (techniques to substantially shorten this time period are possible and include automated measurements).

Preferably, the pH meter comprises: an electronic reader, fixed to the support 12, and a disposable sensor 29, such as a sticker fixed inside the mixing container 16. The sensor 29 is connected to the reader.

The first enclosure 103 of the mixing assembly 102 defines a first chamber 107 in which the first enclosure is able to maintain a controlled atmosphere, for example of the ISO 7 air class (corresponding to pharma class C), as will be described below. This air class (ISO 7) is defined in the ISO 14644 standard. It corresponds to a concentration per $m^3$ of air of at most 2,930 particles of 5 μm (or more), 83,200 particles of 1 μm (or more) and 352,000 particles of 0.5 μm (or more). According to a less efficient variant, an ISO 8 class is acceptable. A more efficient class (ISO 6) would be technically possible in order to guarantee a less polluted atmosphere. But the associated costs would be higher and often unjustified in view of the benefit obtained. An ISO class 5 (even more efficient) is practically impossible to achieve, as the movements of the solid reservoir(s) (where present), of the mixing container, of the transfer needle as well as their vibrations normally generate particles in quantities exceeding the limit defined for ISO class 5. In addition, the air flows required to establish an ISO 5 class environment (corresponding to pharma class A) cause air renewal such that micro-dosing (e.g. using an iris diaphragm) and micro-weighing operations become insufficiently accurate (due to airstream).

As may be seen in FIG. 1, the first chamber 107 is intended to receive the mixing unit 10 previously described. Preferably, the mixing unit 10 and the first enclosure 103 are so designed that the volume of the first chamber 107 is less than 1 $m^3$, and more preferably between 0.1 $m^3$ and 0.3 $m^3$. The first chamber is then considerably smaller than a room in a factory for pharmaceutical composition production. It allows the on-demand manufacture of small batches of pharmaceutical compositions, for example from 1 to 100 vials. This manufacturing can be tailor-made, for example, it can be personalized according to the profile (age, sex, medical history, other current treatments, etc.) of the patient intending to take the pharmaceutical composition. In addition, producing only a small quantity for imminent consumption enables reducing the quantity of preservatives (hence both reducing production costs and reducing the health risks associated with preservatives). Indeed, unstable products are often used in the composition of pharmaceutical compositions and increasing shelf life requires adding more preservatives. Thanks to the invention, it is not necessary to guarantee that the storage period can be as long as it is for mass production, which is intended for much longer distribution channels.

According to one embodiment, the first enclosure 103 comprises at least one opening 108, for which sealing means are provided, as described below. The mixing unit 102 further comprises a needle 120 arranged in the first chamber 107 and directly or indirectly connected by a tube to the opening 108.

A method of operation of the mixing unit 102 and, in particular, of the mixing unit 10 will be described later.

Figure 4:
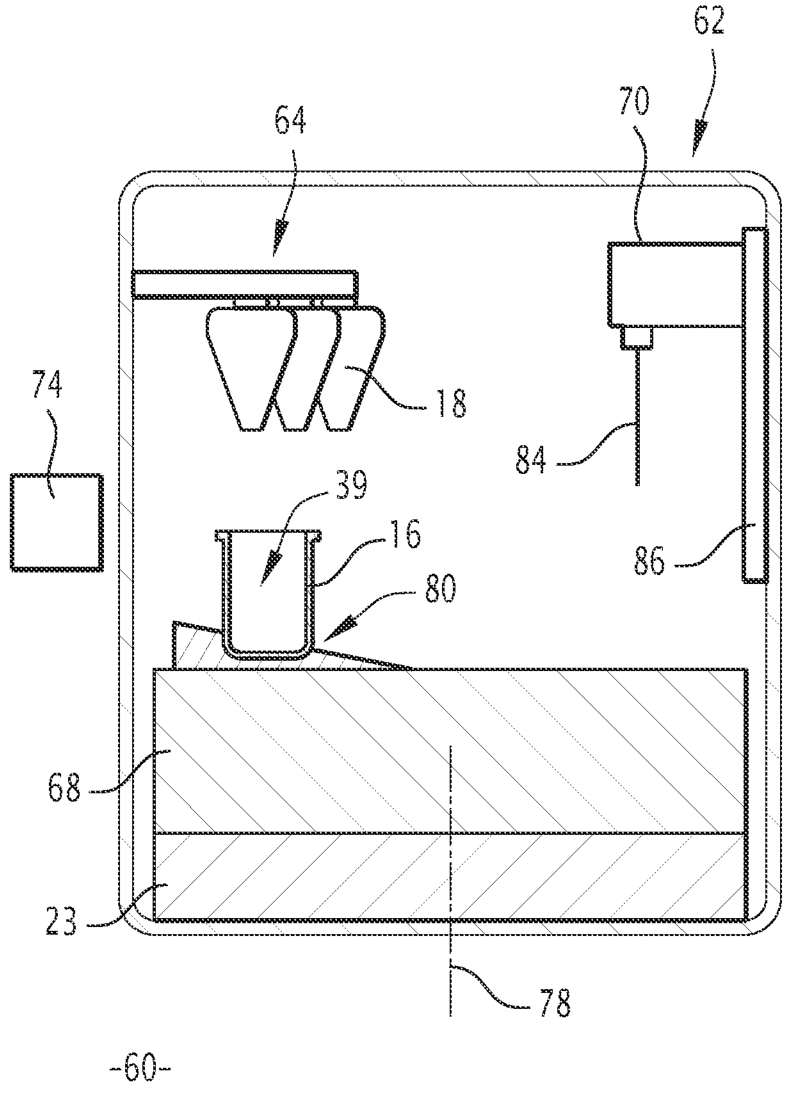
FIGS. 4 and 5 show schematic sectional views of a mixing unit according to a second embodiment of the invention, on either side of the same sectional plane.
Figure 5:
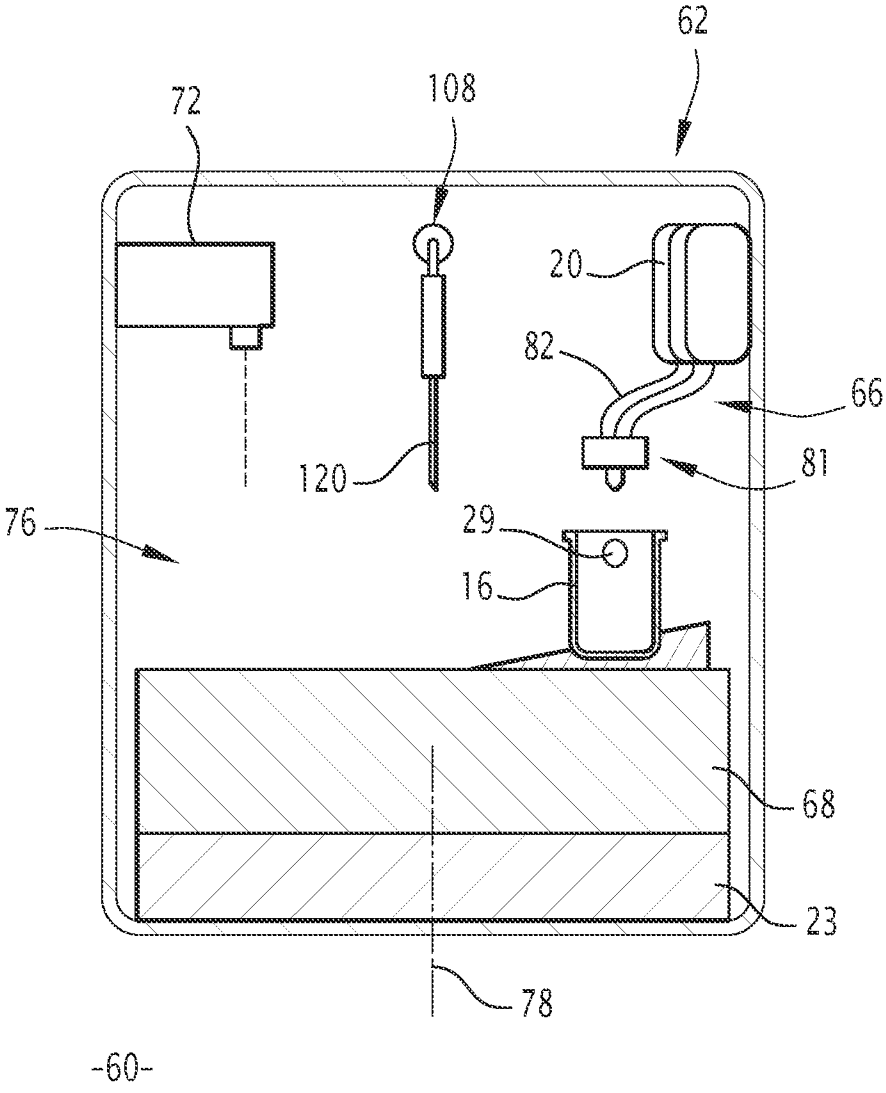

FIGS. 4 and 5 show a mixing unit 60, according to a second embodiment of the invention.

The mixing unit 60 comprises, in particular: a support 62; a mixing container 16; a plurality of reservoirs 18, 20; a first device 64 and a second device 66 for dispensing a starting product; a weighing device 23; a displacement and stirring device 68; at least one analysis device 70, 72; and an electronic control module 74.

The mixing container 16, the reservoirs 18, 20 and the weighing device 23 are similar to those described above for the mixing unit 10 of FIG. 2.

The support 62 has the form of a casing receiving the other elements of the unit 60. Preferably, the casing 62 is able to define a closed compartment 76 with a controlled atmosphere, for example ISO 7 air class, as will be described below.

The displacement and stirring device 68, placed on the weighing device 23, is, in particular, capable of stirring the contents of the mixing container 16.

In particular, in the embodiment of FIGS. 4 and 5, the stirring device 68 is a centrifuge, comprising an axis of rotation 78 that is intended to be arranged vertically. Alternatively, the stirring device may be another type of mechanical stirring device, or a magnetic stirring device positioned on the displacement device with the mixing container 16.

Preferably, the stirring device 68 comprises a housing 80 that is designed to receive the mixing container 16. The housing 80 is off-center with respect to the axis of rotation 78. The displacement and stirring device 68 is thus able to move the mixing container 16 in a horizontal circular path, as will be described later.

Preferably, the housing 80 is hinged in order to be able to incline the mixing container relative to the horizontal surface perpendicular to the axis of rotation. More preferably, the inclination is limited to an angle less than or equal to 45°.

In the embodiment shown in FIGS. 4 and 5, the plurality of reservoirs 18, 20 comprises several solid reservoirs 18 and several liquid reservoirs 20.

The solid reservoirs 18 are fixed to the first distribution device 64, that is itself fixed to an inner wall of the casing 62. In particular, the solid reservoirs 18 are arranged so that the openings 50 of the reservoirs form an arc of circle located vertically in the circular path of the mixing container 16.

The first distribution device 64 comprises a plurality of motors, wherein each of the motors is connected to the stirring rod 42 of one of the solid reservoirs 18.

The second dispensing device 66 comprises a dispensing valve 81, similar to the valve 22 described above for the mixing unit 10. The dispensing valve is located above the circular path of the mixing container 16.

The liquid reservoirs 20 are fixed to an inner wall of the casing 62, above the dispensing valve 81.

The second distribution device 66 further comprises dispensing pipes 82, wherein each pipe connects one of the liquid reservoirs 20 to the dispensing valve 81. The dispensing valve 81 is able to apply a more or less strong pressure to one end of each pipe 82, in order to control the flow of the contents of the corresponding liquid reservoir 20.

In the embodiment shown, the mixing unit 60 comprises analysis devices such as a PH meter 70, wherein the pH meter comprises: a probe 84 and a disposable sensor 29 that is fixed inside of the mixing container 16. The probe 84 is arranged vertically to the circular path of the mixing container 16. The PH meter 70 is connected to a device 86 for vertical displacement relative to the casing 62, wherein the device allows immersion of the probe 84 in the sensor 29, that is itself in contact with the contents of the mixing container 16.

The mixing unit 60 further comprises a spectrometer 72 with or without contact, for example of the UV or Raman type. The spectrometer is arranged vertically with respect to the circular trajectory of the mixing container 16.

The electronic control module 74 is, in particular, able to control the speed and the operation of the displacement and stirring device 68 and the position of the housing 80, in order to move the upper opening 39 of the mixing container 16 under each of the reservoirs 18, under the dispensing valve 81, under the pH meter 70 or under the spectrometer 72. The electronic control module 74 is also able to incline the housing 80 and the mixing container relative to the horizontal when stirring the mixture.

According to a variant of the invention, the mixing unit 60 described above, replaces the mixing assembly 102 in a manufacturing device similar to the device 100 of FIG. 1. For this purpose, the casing 62 comprises an opening 108, while the mixing unit 60 comprises a needle 120 as described above.

According to such a variant, the electronic control module 74 of the mixing unit 60 is optionally integrated with the electronic control module 28 of the manufacturing device.

An operating method of the mixing unit 60 will be described more precisely hereinafter.

The processing unit 104 of the manufacturing device 100 comprises a filtration duct 110, a buffer filling pouch 112 and a filling duct 114, for example disposable gamma-irradiated. In the embodiment shown, the processing unit 104 further comprises a buffer filling pouch 112.

The filtration duct 110 is formed, in particular, by a first flexible tube 116 and a second flexible tube 117. A first end of the first tube 116 is connected to the needle 120 of the mixing assembly 102 or the mixing unit 60. In the embodiment shown in FIG. 1, the first tube 116 passes through the opening 108, while a first seal 118 is arranged between the first tube 116 and the walls of the opening 108.

The filtration duct 110 further comprises: a first pump 122, for example a peristaltic pump; a filter 124 and possibly an analysis device 126.

The first pump 122 and the analysis device 126 are arranged outside the first enclosure 103 and in the path of the first tube 116. A second end of the first tube is connected to the filter 124. Optionally, the filter 124 may be a sterilizing filter. The second tube 117 connects the filter 124 to the buffer filling pouch 112.

The analysis device 126 is, for example, a UV or Raman spectrometer for the final control of the product (for example, the content of active ingredient). In the embodiment shown, the first pump 122 and the analysis device 126 are connected to the electronic module 28 of the manufacturing device 100 previously described. Alternatively, the first pump 122 and/or the analysis device 126 may be connected to another electronic module.

The buffer filling pouch 112, preferably disposable, contains, for example, a buffer solution. The buffer filling pouch 112 preferably has a capacity of less than 5 L and more preferably between 100 mL and 500 mL.

The filling duct 114 is formed, in particular, by a third flexible tube 130, a first end of which is connected to the dilution pouch. The filling duct 114 further comprises a second pump 132 arranged in the path of the third tube 130.

According to a variant not shown, the processing unit does not have a buffer filling pouch 112, while the second tube 117 and third tube 130 are directly connected to one another. In another variant, the second tube 117 and third tube 130 form a single tube (of which they are two parts).

The packaging assembly 106 comprises a packaging unit 140; and preferably a second enclosure 138 with a controlled atmosphere.

Like the first enclosure, this second enclosure is useful in that it improves protection against contamination, particularly by microorganisms or particles that otherwise might have been found in the atmosphere and might have polluted the contents of the mixing unit. It is the atmosphere inside the furniture that constitutes this second enclosure that is controlled, the building in which this furniture is installed being able to be a conventional building (without any particular protection of its interior atmosphere). According to a possible implementation, this second enclosure is located inside the first enclosure. For small production volumes, the second enclosure facilitates GMP compliance while minimizing costs and allowing greater flexibility.

The second enclosure 138 defines a second chamber 142 in which the second enclosure is able to maintain a controlled ISO 5 (or similar) atmosphere. This air class (ISO 5) is defined in the ISO 14644 standard. It corresponds to a concentration per $m^3$ of air of at most 100,000 particles of 0.1 μm (or more), 23,700 particles of 0.2 μm (or more), 10,200 particles of 0.3 μm (or more) 3,520 particles of 0.5 μm (or more), 832 particles of 1 μm (or more) and 29 particles of 5 μm (or more). This is therefore a high requirement, which would be complex to achieve for the first enclosure, which includes many elements subject to vibration, but which is easier for the second enclosure, which also involves higher requirements, relating to packaging.

The packaging unit 140 is particularly suitable for packaging the contents of the mixing container in at least one packaging container. Such packaging units are known from the prior art.

A method of using the manufacturing device 100 will now be described.

First, the mixing unit 10 is arranged in the first enclosure 103 to form the mixing assembly 102. The needle 120, which may, for example, be pre-sterilized, is connected to the first tube 116 via the opening 108. Advantageously, the first enclosure 103 has at least one opening (the size of which being close to the size of a human hand) sealed with a flexible glove leading into the inside of the first enclosure, allowing an operator to operate inside the first chamber without introducing pollution (by inserting his hands into the gloves of his choice, or at least by inserting one hand into a glove, the face of each glove which is located inside the first enclosure remaining clean). Then, the chamber 107 is sanitized and/or sterilized, for example by steam, ozone or hydrogen peroxide. Sanitization and sterilization both facilitate compliance with GMPs.

In parallel, the packaging unit 140 is arranged in the second enclosure 138 to form the packaging assembly 106.

The processing unit 104 is preferably installed pre-sterilized. For example, disposable elements, such as the second tube 117, the possible filter 124, the possible buffer filling pouch 112, the third tube 130 and the pump 132 may be pre-sterilized.

Once the first chamber 107 has been sanitized and/or sterilized and the second chamber 142 optionally sterilized, the connections of the first tube 116, the second tube 117 and the third tube 130 of the processing unit 104 are effected to finalize the manufacturing device 100 as shown in FIG. 1.

A method of operation of the manufacturing device 100, and, in particular, of the mixing unit 10, is then implemented by means of a program recorded in the electronic module 28. According to the variant of the invention according to which the method of manufacturing the device comprises the mixing unit 60 of FIGS. 4 and 5, a similar method of operation of the mixing unit 60 is implemented by means of a program recorded in the electronic module 74.

For each reservoir 18, 20 of the mixing unit 10 or 60, the program stores a quantity necessary for the production of a given pharmaceutical composition. According to the operating method of the mixing unit 10 or 60, the necessary amount of active ingredient contained in each of the reservoirs 18 and/or 20 is dispensed in the mixing container 16; and then the mixing container is stirred.

Preferably, the dispensing of the starting materials in liquid form is performed first.

In the case of the mixing unit 10, the first coupling member 36 takes a first liquid reservoir 20 and the mechanical arm 14 assembles the first reservoir with the dispensing valve 22. The valve 22, actuated by the electronic module 28, allows gravity flow of the liquid into the mixing container 16.

In the case of the mixing unit 60, the electronic module 74 actuates the displacement and stirring device 68 in order to position the mixing container 16 under the dispensing valve 81. The valve releases the pressure on a dispensing tube 82 connected to a first liquid reservoir 20, allowing gravity flow of the liquid into the mixing container 16.

For each mixing unit 10, 60, the mass of liquid received in the container is controlled by the weighing device 23. The dispensing valve 22, 81 preferably allows a maximum flow rate until the mass of liquid measured by the weighing device 23 reaches a predetermined percentage of the desired value, wherein the value and the percentage are stored in the electronic module 28, 74. The percentage is, for example, of the order of 95% or 97%. The flow rate is then progressively reduced until the desired value is obtained.

The dispensing step above is repeated for each liquid reservoir required for the manufacture of the desired pharmaceutical composition.

The dispensing of the starting materials in solid form is then carried out.

Figure 2:
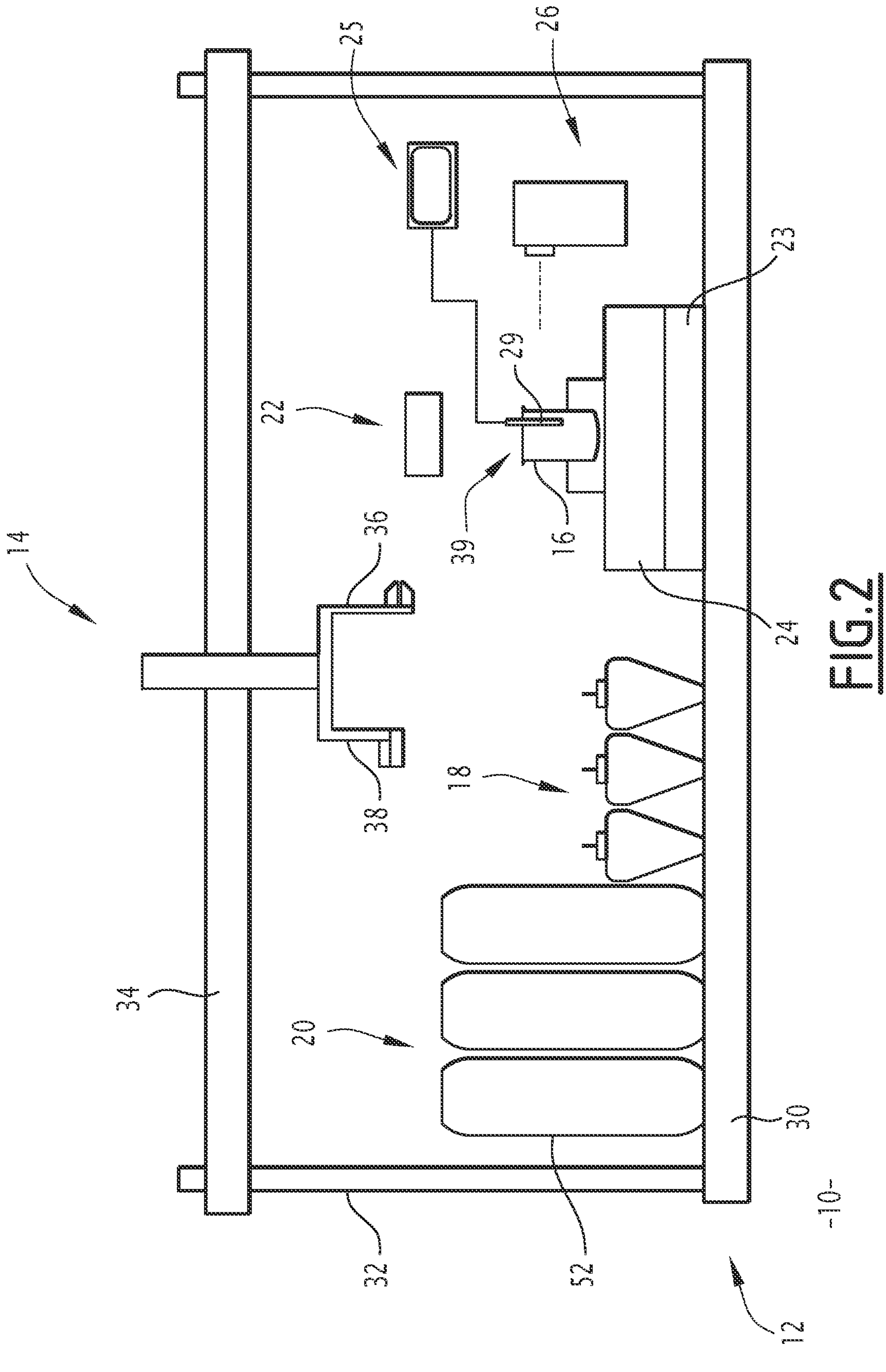
FIG. 2 shows a schematic view of the mixing unit of the device of FIG. 1, according to a first embodiment of the invention.

In the case of the mixing unit 10, the mechanical arm 14 moves relative to the support 12 and the second coupling member 38 of the arm assembles with a first solid reservoir 18 and, in particular, at the second end 48 of the stirring rod 42 (FIGS. 2 and 3). The arm 14 then moves the first reservoir 18 above the upper opening 39 of the mixing container 16. The motor of the second coupling member 38 sets in motion the stirring rod 42. The dispensing mechanism 44 opens partially in order to allow gravity flow of the powder through the opening 50 so formed.

In the case of the mixing unit 60, the electronic module 74 actuates the displacement and stirring device 68 in order to position the mixing container 16 under a first solid reservoir 18. The motor of the first dispensing device 64, associated with the reservoir 18, sets the stirring rod 42 in motion. The dispensing mechanism 44 partially opens in order to allow gravity flow of the powder through the opening 50 thus formed.

For each mixing unit 10, 60, the mass of powder received in the mixing container 16 is controlled by the weighing device 23. The size of the opening 50 is controlled by the program during the flow. For example, the opening 50 has a maximum size until the mass of powder measured by the weighing device 23 reaches a given percentage of the desired value, for example 95% or 97% of the value. The opening 50 is then progressively reduced until the desired value is obtained.

The dispensing step above is repeated for each solid reservoir 18 required for the manufacture of the desired pharmaceutical composition.

For each mixing unit 10, 60, the stirring device 24, 68 is then operated for a certain time (e.g. a few minutes), in order to mix the contents of the mixing container 16. At least one analysis device is then actuated under the control of the electronic module 28, 74. If a measured value is different from a value determined by the program, the value is adjusted by adding a solution contained in one of the liquid reservoirs 20 or a solid contained in the one of the solid reservoirs 18.

For example, the pH of the content of the mixing container 16 may be controlled using the pH meter 25, 70 and/or a concentration of the content is measured by the spectrometer 26, 72.

Optionally, if it is necessary to produce a solution with a volume greater than the capacity of the mixing container, the contents of the mixing container are transferred to another higher-volume mixing container. The latter is equipped, for example, with different liquid addition stations and other stirring and analysis devices.

According to a first embodiment of the invention, a method of operating the processing unit 104 and the packaging unit 106 is then implemented by means of a program recorded in the electronic module 28.

In a first step, the needle 120 is first introduced into the mixing container 16, for example by the mechanical arm 14 or by a vertical movement. The first pump 122 is then actuated, wherein the solution contained in the mixing container 16 is then sucked into the filtration duct 110. The solution is preferably analyzed by the device 126 in order to control the quality of the solution. The solution is then optionally filtered through the filter 124. The solution then reaches the buffer filling pouch 112.

In a second step, the second pump 132 is actuated and the contents of the dilution pouch 112 are sucked into the filling duct 114, up to the packaging unit 140. In known manner, the packaging unit 140 conditions the solution in at least one packaging container.

According to a second embodiment of the invention, the processing unit 104 does not comprise a buffer filling pouch 112; and the method of operation of the processing unit 104 and the packaging assembly 106 is implemented as follows:

The needle 120 is first introduced into the mixing container 16. The first pump 122 is then actuated, wherein the solution contained in the mixing container 16 is thus sucked into the filtration duct 110. The solution is preferably analyzed by the device 126, and is then optionally filtered by the filter 124 (e.g. a sterilizing filter), then the solution is transferred to the packaging unit 140. In known manner, and the packaging unit 140 conditions the solution in at least one packaging container.

The above methods are carried out in a sterile environment, wherein the steps implemented in the first enclosure 103 and second enclosure 138 are performed under a controlled atmosphere. Such a method makes it possible to rapidly prepare and automatically package a certain number of doses, which may be, for example, individualized, with a given pharmaceutical composition.

The sterilization steps are nonetheless optional and depend on the composition produced.

Between two preparation cycles, it is easy to replace or modify the reservoirs 18, 20 and their contents, as well as the disposable equipment, which allows the preparation of a wide range of pharmaceutical compositions.

The manufacturing device 100 described above has been implemented and made it possible to produce and release in less than two hours doses of pharmaceutical composition designed for one, or several, patients. The device 100 may be produced at low cost and therefore could equip a large number of hospitals or pharmacies, in order to allow local access to patients.

Since the pharmaceutical compositions are produced in small quantities, it is not necessary to arrange for restrictive storage conditions for the compositions having a short shelf life.

The invention claimed is:

1. A method of manufacturing a pharmaceutical composition using a device for manufacturing pharmaceutical compositions, wherein the device comprises a mixing assembly comprising:

- a first enclosure with a controllable atmosphere having a mixing unit disposed therein, wherein the mixing unit comprises:
  - a support;
  - a mixing container received on the support;
  - a plurality of reservoirs, wherein each reservoir is configured to contain a quantity of a starting material for the pharmaceutical composition,
  - at least one dispensing device that is configured to dispense an amount of a starting material for the pharmaceutical composition into the mixing container, wherein the at least one dispensing device is assembled with or configured to be assembled with one of said reservoirs; and
  - a stirring device that is configured to rotate the mixing container or stir contents of the mixing container, or both;
- an electronic module configured to control the at least one dispensing device and the stirring device; and
- a packaging assembly configured to package contents of the mixing container into at least one packaging container, the packaging assembly comprising a second enclosure with a controllable atmosphere, the second enclosure having a packaging unit disposed therein, wherein the method comprises:

- dispensing into the mixing container an amount of a first starting material contained in a first reservoir of the plurality of reservoirs;
- dispensing into the mixing container an amount of a second starting material contained in a second reservoir of the plurality of reservoirs; and
- stirring the contents of the mixing container to obtain the pharmaceutical composition.

2. The method according to claim 1, wherein, in the device, the first enclosure for the mixing assembly defines a first chamber configured to be maintained at a controlled atmosphere of air class ISO 7.

3. The method according to claim 1, wherein, in the device, the mixing unit further comprises a mechanical arm that is movable relative to the support, wherein an end of the mechanical arm comprises a coupling member, wherein the mechanical arm is configured to move at least one of the plurality of reservoirs with respect to the mixing container.

4. The method according to claim 1, wherein, in the device, the mixing unit further comprises a device configured to move the mixing container to a dispensing position with respect to the at least one dispensing device.

5. The method according to claim 1, wherein, in the device:

- the plurality of reservoirs comprises one or more of a solid reservoir and a liquid reservoir; and
- the at least one dispensing device comprises one or more of:
  - a solid dispensing device assembled with or configured to be assembled with the at least one solid reservoir, wherein the solid dispensing device is configured to dispense a quantity of powdery solid composition into the mixing container; and
  - a liquid dispensing device that is assembled with or configured to be assembled with the at least one liquid reservoir, wherein the liquid dispensing device is configured to dispense a quantity of liquid composition into the mixing container.

6. The method according to claim 1, wherein, in the device, the stirring device is selected from (i) a centrifugation device that is configured to receive the mixing container to rotate the container; (ii) a magnetic stirring device, and (iii) a mechanical stirring device.

7. The method according to claim 1, wherein, in the device, the mixing unit further comprises a weighing device configured to receive the mixing container, wherein the weighing device is electronically connected to the electronic control module.

8. The method according to claim 1, wherein, in the device, the mixing unit further comprises at least one analysis device that is configured to analyze the contents of the mixing container.

9. The method according to claim 1, wherein the device further comprises a processing unit, wherein the processing unit is configured to process the contents of the mixing container and comprises a filter.

10. The method according to claim 1, wherein, in the device, the second enclosure defines a second chamber configured to be maintained at a controlled atmosphere of air class ISO 5.

11. The method according to claim 1, wherein, in the device, a volume of the first chamber is less than 1 $m^3$.

12. The method according to claim 1, wherein, in the device, the mixing unit further comprises a weighing device configured to receive the mixing container, wherein the weighing device is electronically connected to the electronic control module, wherein the method comprises:

- receiving the mixing container on the weighing device; and
- performing a dispensing step by (i) moving a first reservoir of the plurality of reservoirs such that, once assembled with the first reservoir, one of the at least one dispensing devices is above the mixing container or by (ii) moving the mixing container to be below one of the at least one dispensing devices, and then actuating said dispensing device to thereby deposit by gravity into the mixing container a predetermined mass of starting material contained in the first reservoir, wherein deposition of the predetermined mass of starting material is controlled by the weighing device; and
- stirring the contents of the mixing container.

13. The method according to claim 1, wherein, in the device, the mixing unit further comprises at least one analysis device that is configured to analyze contents of the mixing container, wherein the method comprises:

- dispensing into the mixing container an amount of a first starting material contained in a first reservoir of the plurality of reservoirs;

dispensing into the mixing container an amount of a second starting material contained in a second reservoir of the plurality of reservoirs;

stirring the contents of the mixing container to obtain the pharmaceutical composition; and analyzing the contents of the mixing container by the at least one analysis device.

14. The method according to claim 13, further comprising:

if a result of the analysis is different from an expected result, adding an amount of a starting material for the pharmaceutical composition to the mixing container.

15. The method according to claim 1, wherein the device further comprises a processing unit, wherein the processing unit is configured to process the contents of the mixing container and comprises a filter, wherein the method comprises:

dispensing into the mixing container an amount of a first starting material contained in a first reservoir of the plurality of reservoirs;

dispensing into the mixing container an amount of a second starting material contained in a second reservoir of the plurality of reservoirs;

wherein one or both of the first starting material and the second starting material are in the form of a liquid composition;

stirring the contents of the mixing container to obtain the pharmaceutical composition; and after the stirring step, filtering the contents of the mixing container using the filter.

16. The method according to claim 1, further comprising, after the stirring step, operating the packaging assembly to package the contents of the mixing container into at least one packaging container.

* * * * *